(12) United States Patent
Bonen et al.

(10) Patent No.: US 9,558,066 B2
(45) Date of Patent: Jan. 31, 2017

(54) EXCHANGING ECC METADATA BETWEEN MEMORY AND HOST SYSTEM

(71) Applicants: Nadav Bonen, Ofer (IS); Kuljit S Bains, Olympia, WA (US); John B Halbert, Beaverton, OR (US)

(72) Inventors: Nadav Bonen, Ofer (IS); Kuljit S Bains, Olympia, WA (US); John B Halbert, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 115 days.

(21) Appl. No.: 14/498,657

(22) Filed: Sep. 26, 2014

(65) Prior Publication Data

US 2016/0092307 A1    Mar. 31, 2016

(51) Int. Cl.
G11C 29/00    (2006.01)
G06F 11/10    (2006.01)

(52) U.S. Cl.
CPC ....... *G06F 11/1076* (2013.01); *G06F 11/1004* (2013.01)

(58) Field of Classification Search
None
See application file for complete search history.

(56) References Cited

U.S. PATENT DOCUMENTS

| 8,819,336 | B2* | 8/2014 | Kwon | ............... | G06F 11/1441 |
| | | | | | 711/103 |
| 2009/0070651 | A1* | 3/2009 | Diggs | ............... | G06F 11/1068 |
| | | | | | 714/752 |
| 2010/0262889 | A1 | 10/2010 | Bains | | |
| 2011/0154163 | A1* | 6/2011 | Cornwell | ............ | G06F 11/0742 |
| | | | | | 714/773 |
| 2012/0216094 | A1 | 8/2012 | Yoo et al. | | |
| 2013/0024736 | A1 | 1/2013 | Roohparvar et al. | | |
| 2013/0268719 | A1 | 10/2013 | Dover et al. | | |
| 2013/0332798 | A1 | 12/2013 | Keays et al. | | |
| 2014/0047265 | A1* | 2/2014 | Das | .................. | G06F 11/1666 |
| | | | | | 714/6.11 |
| 2014/0075265 | A1 | 3/2014 | Hung et al. | | |
| 2014/0136926 | A1 | 5/2014 | Radke et al. | | |
| 2014/0181615 | A1* | 6/2014 | Kwok | .............. | H03M 13/2906 |
| | | | | | 714/755 |
| 2014/0281808 | A1 | 9/2014 | Lam | | |
| 2015/0084971 | A1* | 3/2015 | Dodge | ................ | G06F 9/4856 |
| | | | | | 345/520 |
| 2016/0004452 | A1* | 1/2016 | Hayes | ................ | G06F 3/065 |
| | | | | | 714/758 |

OTHER PUBLICATIONS

International Search Report and Written Opinion for PCT Patent Application No. PCT/US2015/048776, Mailed Dec. 14, 2015, 12 pages.

* cited by examiner

*Primary Examiner* — Daniel McMahon
(74) *Attorney, Agent, or Firm* — Compass IP Law PC

(57) ABSTRACT

Providing access to an external memory controller to internal error correction bits from a memory device for use as metadata bits by the memory controller. In a first mode the memory device applies internal error correction bits for internal error correction at the memory device. In a second mode the memory device provides access to the internal error correction bits to the memory controller to allow the memory controller to use the data.

20 Claims, 6 Drawing Sheets

400

TABLE 450

| INTERFACE | BURST | DM(x) | DM(y) | DM(z) | DM(w) |
|---|---|---|---|---|---|
| x16 | 8 | 01234567 | N/A | N/A | N/A |
|  |  | 0123xxxx | 4567xxxx | N/A | N/A |
|  |  | 01xxxxxx | 23xxxxxx | 45xxxxxx | 67xxxxxx |
| x32 | 4 | 0123 | 4567 | N/A | N/A |
|  |  | 01xx | 23xx | 45xx | 67xx |
| x64 | 2 | 01 | 23 | 45 | 67 |

EXCHANGING ECC METADATA BETWEEN MEMORY AND HOST SYSTEM

FIELD

Embodiments of the invention are generally related to memory devices, and more particularly to a memory exposing internal error correction bits as metadata bits.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2014, Intel Corporation, All Rights Reserved.

BACKGROUND

Computing devices use memory devices to store data and code for a processor to execute its operations. As the memory devices decrease in size and increase in density, they experience more errors during processing, referred to as yield issues. Thus, memory devices experience increasing bit failures, even with modern processing techniques. To mitigate bit failures, modern memory provide internal error correction mechanisms, such as ECC (error correction codes). The memory devices generate the ECC data internally, and use the ECC data internally at the memory devices. The internal error correction within a memory device can be in addition to whatever system-wide error correction or error mitigation used in data exchanges between the memory devices and the memory controllers. It will be understood that the application of ECC within a memory device requires additional logic to compute the ECC, and to apply it to correct data bits. It will also be understood that the application of ECC internal to a memory device requires the ECC to be computed and applied in real time as data is exchanged with a memory controller or other component external to the memory device. Such realtime requirements can introduce delays into the data exchanges.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
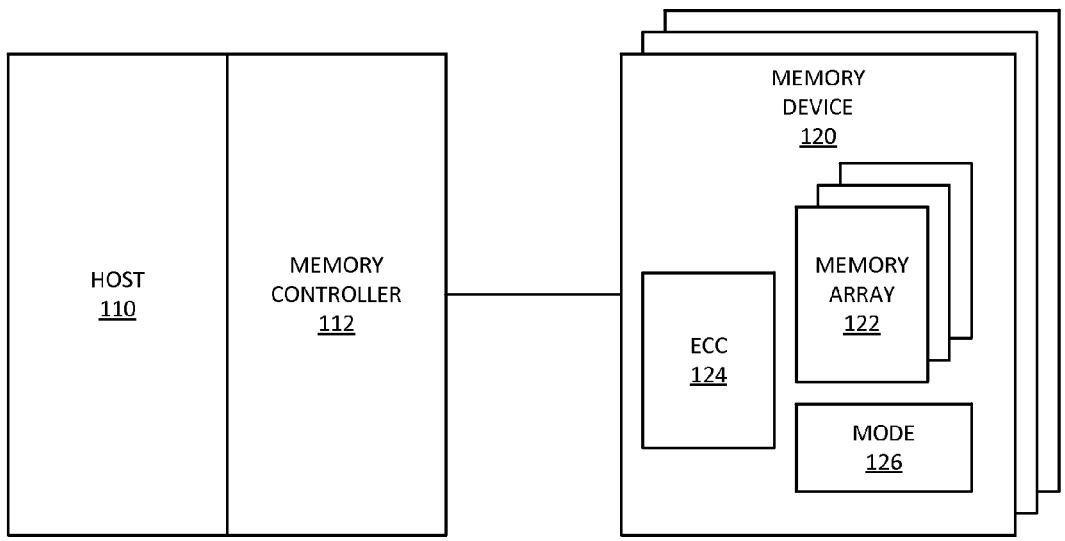
FIG. 1 is a block diagram of an embodiment of a system with a memory device that can expose internal error correction bits for use by an external memory controller.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, a memory device exposes internal error correction bits for use as metadata bits by an external memory controller. Modern memory device designs (such as DRAM (dynamic random access memory) designs) use internal error correction to compensate for yield issues. In one embodiment, the memory devices can expose the internal error correction bits to allow the memory controller to perform the error correction. In one embodiment, the memory devices can expose the internal error correction bits to allow the memory controller to use the bits as metadata for purposes other than error correction of the data signal. In one embodiment where the memory controller performs error correction with the internal error corrections bits, the memory device can read/write 128 bits per transaction and exchange 8 bits for error correction. Thus, the memory subsystem can provide single error correction (SEC) using 136/128 hamming codes (8 dedicated bits per 128 data bits). In one embodiment, the memory subsystem can provide additional metadata bits to use for error correction, which can provide the 9 bits needed to perform SECDED (single error correction, dual error detection).

In one embodiment, the memory device is configured to be bimodal. In a first mode the memory device applies internal error correction bits for internal error correction at the memory device. Such a mode would be consistent with how memory devices traditionally operate. In a second mode the memory device exposes the internal error correction bits to the memory controller to allow the memory controller to use the data. Thus, it will be understood that in the second mode, the memory controller is the consumer of the metadata represented by the internal error correction bits. The memory device and the memory controller can exchange the metadata via any of a number of different techniques. In one embodiment, the memory device and memory controller exchange the metadata via an extra burst on a data exchange. Such an approach would decrease the system bandwidth and might not be the best approach for all implementations. In one embodiment, the memory device and memory controller exchange the metadata via extra pins or connectors added to the memory package. It will be understood that such an approach increases packaging and other manufacturing costs, as well as increasing the routing requirements on system boards. In one embodiment, the memory device and memory controller exchange the metadata on repurposed existing pins or connectors. For example, the system can send the data on signal lines that are not in use during a read or write operation. As another example, the system can be configured to eliminate a particular function in favor of using the metadata, and thus repurpose a pin that could be used during read or write operations.

In one embodiment, the memory subsystem performs error correction at the memory controller with the internal bits from the memory device. Such an implementation offers certain advantages over traditional use of the error correction bits internally to the memory devices. For example, error correction at the memory controller can eliminate the need to have ECC logic within the memory device or DRAM itself. Such an implementation also allows the memory controller to perform error correction calculations instead of the memory device. The memory controller can perform error correction bit calculations at a slower speed prior to queueing up the data for write, which decreases the timing requirements for the memory device on writes. Likewise, on reads, the memory device can simply access and send the error correction bits, which the memory controller can compute and perform error correction on the data using faster transistors than typically found on a memory device, which would otherwise need to perform the operations prior to sending the data.

Reference is made herein to memory devices of differing interfaces. It will be understood that the interface type refers to the number of data signal lines that can be driven by the memory device. A x16 memory device refers to a device with a 16-bit wide data I/O (input/output) interface. Similarly, a memory device can have a x32 interface or a x64 interface (referring, respectively, to devices with either a 32-bit or 64-bit wide data I/O interface). Other common memory device configurations include x8 and x4 devices.

Reference to memory devices can apply to different memory types. Memory devices generally refer to volatile memory technologies. Volatile memory is memory whose state (and therefore the data stored on it) is indeterminate if power is interrupted to the device. Nonvolatile memory or storage holds its state even if power is interrupted (subject to degradation over long periods of time). Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (dual data rate version 3, original release by JEDEC (Joint Electronic Device Engineering Council) on Jun. 27, 2007, currently on release 21), DDR4 (DDR version 4, initial specification published in September 2012 by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM DRAM (HIGH BANDWIDTH MEMORY, JESD235, originally published by JEDEC in October 2013), and/or others, and technologies based on derivatives or extensions of such specifications.

FIG. 1 is a block diagram of an embodiment of a system with a memory device that can expose internal error correction bits for use by an external memory controller. System 100 includes elements of a memory subsystem in a computing device. Host 110 represents a host computing platform that executes an operating system (OS) and applications. The OS and applications execute operations that result in memory accesses. Host 110 includes a processor or processing unit, which can be a single or multicore processor. System 100 can be implemented as an SOC, or be implemented with standalone components.

Memory controller 112 represents control logic that generates memory access commands in response to the execution of operations by the processor(s). In one embodiment, system 100 includes multiple memory controllers. In one embodiment, system 100 includes one or more memory controllers per channel, where a channel couples to access a number of memory devices. Each channel is an independent access path to memory, thus, multiple different memory accesses can occur in parallel on different channels. In one embodiment, memory controller 112 is part of host 110, such as logic implemented on the same die or package space as a host processor.

Memory devices 120 represent memory resources for system 100. Memory devices 120 each include multiple memory arrays 122. Memory arrays 122 represent the logic where memory device 120 stores the data bits. Memory devices 120 each include mode logic 126. Mode logic 126 can refer to a Mode Register or other mechanism within the memory device that stores configuration settings. In one embodiment, the implementation for a specific memory device is set within mode logic 126. Based on settings in mode logic 126, memory device 120 can be configured to operate in one of two different modes with respect to error correction. In a first mode, memory device 120 applies error correction internally based on error correction bits stored locally. Applying error correction internally can enable memory device 120 to address scaling issues such as refresh timings, VRT (variable retention time), or other scaling issues. In a second mode, memory device 120 exposes the error correction bits to memory controller 112. Exposing the error correction bits can refer to allowing memory controller 112 to write the internal error correction bits and to sending the internal error correction bits to memory controller 112.

In one embodiment, memory device 120 includes ECC 124, which represents logic and memory to implement error correction. Thus, ECC 124 represents the ability of memory device 120 to generate and use internal error correction bits. As described herein, memory device 120 exposes ECC 124 to memory controller 112, such as via an interface that is parallel to a data interface shared between memory controller 112 and memory device 120. It will be understood that ECC 124 can introduce read and write latency for memory access by memory controller 112. When memory device 120 applies error correction internally only via ECC 124, error correction logic can introduce read latency by computing and correcting on the fly, and/or by speculatively using the error correction data.

In one embodiment, error correction logic of ECC 124 can be idle during a mode where memory controller 112 computes and uses error correction bits. In one embodiment, such a mode is the only mode available to memory device 120, and the memory device can be designed and manufactured without internal error correction logic that would otherwise be used to compute ECC and/or perform error correction. Thus, in one embodiment, ECC 124 could represent only the storage used for internal error correction bits, and the logic necessary to exchange such bits with memory controller 112, but without logic to otherwise use the bits internally.

In one embodiment, memory device 120 includes bimodal operation including a first mode that uses ECC 124 internally only, and a second mode that exposes ECC 124 to memory controller 112. In the first mode, during write, memory device 120 can receive or accumulate data (e.g., 128 bits), generate ECC code on the received bits via ECC 124, and write both the data and extra bits (e.g., 8 bits). In a second mode, during write, memory controller 112 internally generates metadata and sends it to memory device 120 along with the data. If the metadata is ECC data, the controller can compute the ECC offline before marking the data as ready for scheduling. Write data is not latency sensitive and so such an operation does not incur a performance loss. In the first mode, during read, memory device 120 prefetches data (e.g., 128 bits), and generates ECC for the prefetched data, compares the generated ECC with stored ECC, and corrects a single error with ECC 124 before sending the data to memory controller 112. In the second mode, during read, memory device 120 accesses ECC data via ECC 124, and sends it to memory controller 112 as metadata. Memory controller 112 internally uses the metadata. If the metadata is ECC data, the controller internally computes ECC, compares it with the received ECC, and corrects the data accordingly. If the metadata is non-error correction data, memory controller 112 uses the data for other purposes.

In one embodiment, the internal error correction bits from ECC 124 of memory device 120 can provide a use in a read-modify-write (RMW) or partial write operation. In one embodiment, memory device 120 does not need to perform RMW calculation operations internally, but RMW calculation operations can occur within memory controller 112 before transferring the data to memory device 120. In the first mode, memory device 120 would prefetch data and merge it with partial write data. Memory device 120 would then compute ECC via ECC 124 and write the data and the ECC to memory array(s) 122. In the second mode, memory controller 112 can merge the data and compute ECC for it. Alternatively memory controller 112 can stale the ECC and write it with a "non-valid" value.

It will be understood that multiple memory devices 120 can be connected to the same memory controller 112. System 100 can include multiple memory controllers 112 (not specifically shown) connected to host 110. In one embodiment, the metadata exchanged between memory controller 112 and memory devices 120 is used for ECC. In such an implementation, memory controller 112 can include ECC logic, and operate the logic once per channel for a memory access, instead of having multiple instances of ECC logic in each memory device 120.

Figure 2:
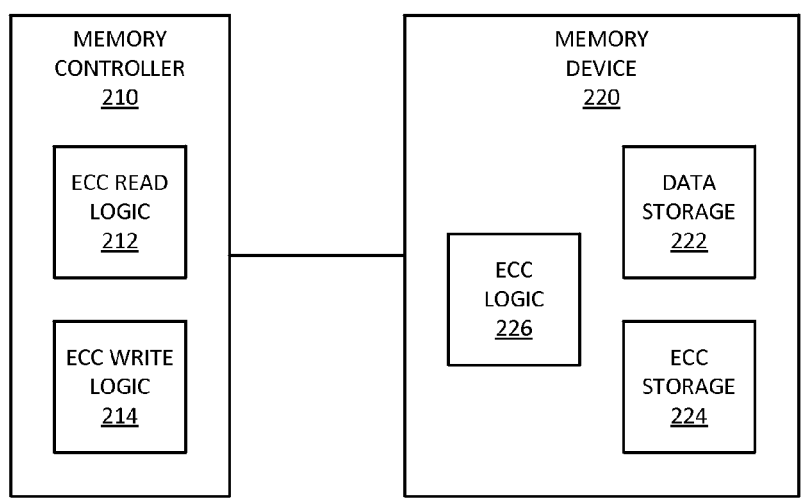
FIG. 2 is a block diagram of an embodiment of a system with a memory device that can expose internal error correction bits for use by an external memory controller.

FIG. 2 is a block diagram of an embodiment of a system with a memory device that exposes internal error correction bits for error correction by an external memory controller. System 200 can be one example of system 100 of FIG. 1. Specifically, system 200 is configured to have memory controller 210 perform error correction operations instead of having memory device 220 perform the operations. Memory controller 210 represents logic that controls memory access to memory device 220. In one embodiment, memory controller 210 includes ECC read logic 212 and ECC write logic 214.

Memory device 220 includes data storage 222, which represents storage space in memory device 220 where the memory device writes data received from memory controller 210 and accesses stored data to send to memory controller 210. In one embodiment, memory device 210 includes ECC storage 224, which represents storage space where memory device 220 stores ECC or other error correction data. ECC storage 224 can be said to represent a location where memory device 220 stores internal error correction bits. In one embodiment, ECC storage 224 is part of data storage 222, such as a specially designated range of addresses. In one embodiment where ECC storage 224 is part of data storage 222, the system can increase the page size to store ECC data. For example, the system can increase the page size from 1024 bytes to 1088 bytes. In one embodiment, memory device 220 includes registers or some other separate storage location for ECC storage 224.

In one embodiment, memory device 220 includes ECC logic 226. ECC logic 226 represents logic the memory device uses to compute error correction. ECC logic 226 can represent logic within memory device to control the application of error correction from internally within memory device 220 to externally at memory controller 210. In one embodiment, memory device 220 does not include ECC logic 226, at least as far as logic to perform ECC calculations or other operations. Memory device 220 includes an interface with memory controller 210 to exchange the error correction metadata, which can include connectors and logic to control the interface.

For a read memory access operation, ECC read logic 212 enables memory controller 210 to receive internal error correction bits from ECC storage 224 and compute error correction and correct errors in data retrieved from data storage 222. Thus, memory controller 210 can correct errors with error correction data stored at memory device 220 (internal error correction bits) instead of having the memory device perform the error correction. Such an operation can improve read latency.

For a write memory access operation, ECC write logic 214 enables memory controller 210 to compute error correction data at the memory controller and send the error correction data to memory device 220 for storage with the data. Such an operation can improve write latency. It will be understood that "internal error correction bits" can refer to the error correction data computed by memory controller 210, because it will be stored in memory device 220 with the error correction mechanisms traditionally used for internal error correction. For error correction metadata computed by ECC write logic 214, memory device 220 stores the error correction data in ECC storage 224, and retrieves it for a read access to the same memory location associated with the write operation. For partial write or RMW, ECC write logic 214 enables memory controller 210 to read the data from data storage 222, modify the data, calculate error correction, and write the data back with the appropriate error correction.

Figure 3:
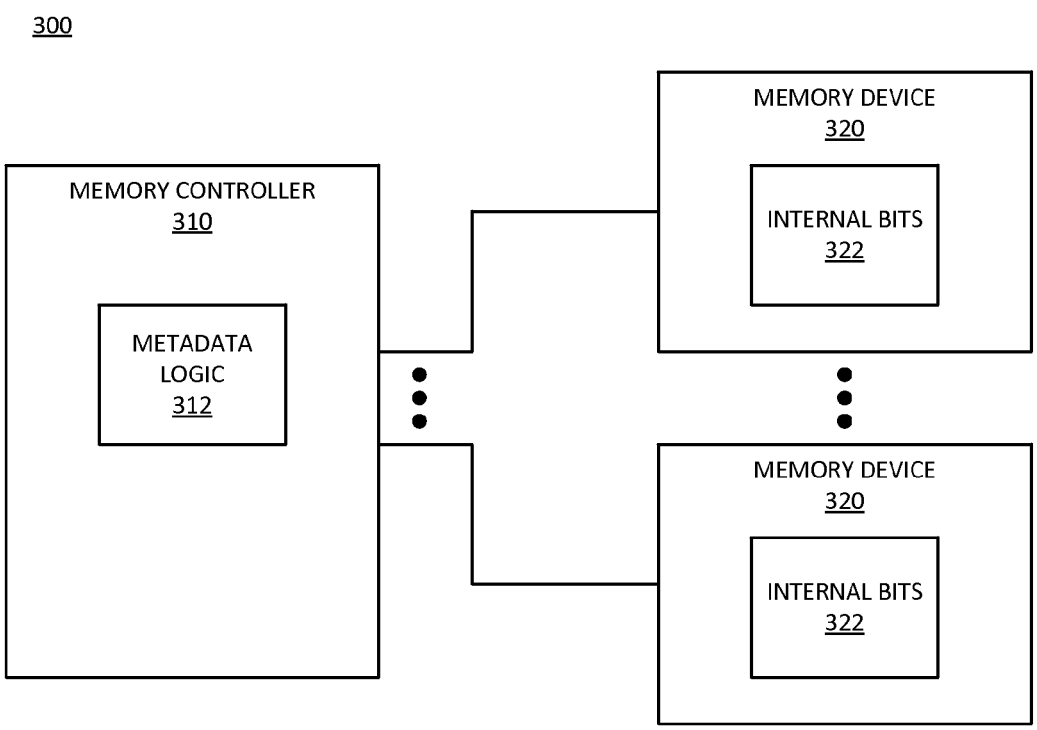
FIG. 3 is a block diagram of an embodiment of a system in which a memory controller gangs internal error correction bits from multiple memory devices.

FIG. 3 is a block diagram of an embodiment of a system in which a memory controller gangs internal error correction bits from multiple memory devices. System 300 can be one example of a system in accordance with system 100 of FIG. 1 or system 200 of FIG. 2. System 300 includes memory controller 310, which controls memory access operations for memory devices 320. In one embodiment, memory devices 320 represent a rank of memory. It will be understood that a rank of memory refers to multiple devices ganged together in parallel, which are selected and accessed together on memory access operations.

Each memory device 320 includes internal error correction bits 322. Each memory device 320 can expose internal bits 322 to memory controller 310 in accordance with any embodiment described herein. In one embodiment, system 300 gangs together all internal bits 322 of the multiple memory devices 320. Thus, system 300 allows for more bits of data to be exchanged as metadata. In the case of using the metadata for ECC, using internal bits 322 from multiple memory devices 320 can provide stronger error correction. Memory controller 310 includes metadata logic 312 to combine internal bits 322 from multiple memory devices 320. Metadata logic 312 represents logic (hardware and/or software) in memory controller 310 that enables memory controller 310 to send and receive internal bits 322 as metadata with memory devices 320. In one embodiment, metadata logic 312 combines internal bits from multiple memory devices 320 to increase the number of bits of metadata available.

In traditional implementations where memory device 320 performs internal error correction, it will be understood that memory device 320 would need to prefetch data and perform error correction operations at a high clock speed. The high clock speed needs to be sufficient to allow the memory device to perform the operations in time to send the data to memory controller 310 on read or store the data on write. In one embodiment, memory device 320 can prefetch the data at a slower clock when exposing internal bits 322 to memory controller 310. Additionally, metadata logic 312 of memory controller 310 can operate on the metadata at a slower clock.

Assume in one example that memory devices 320 perform an internal prefetch of 128 bits of data, while read/write data is 64 bits. By combining the data from two memory devices 320 (two different cachelines) memory controller 310 can exchange the full bandwidth of 128 bits of data. In one embodiment, metadata logic 312 computes ECC based on internal bits 322, and can compute ECC for both cachelines together. For a x8 device, memory controller 310 can exchange 4 bits of metadata to each of two memory devices 320.

In one embodiment, metadata logic 312 transfers metadata in an extra data burst to be used for ECC. In such an implementation, memory device 320 can transfer read metadata on a first burst, and metadata logic 312 can transfer write metadata on the last burst. By sending the read metadata on the first burst and the write metadata on the last burst, metadata logic 312 can relax the computations for ECC during writes, and perform early detection during read.

Figure 4:
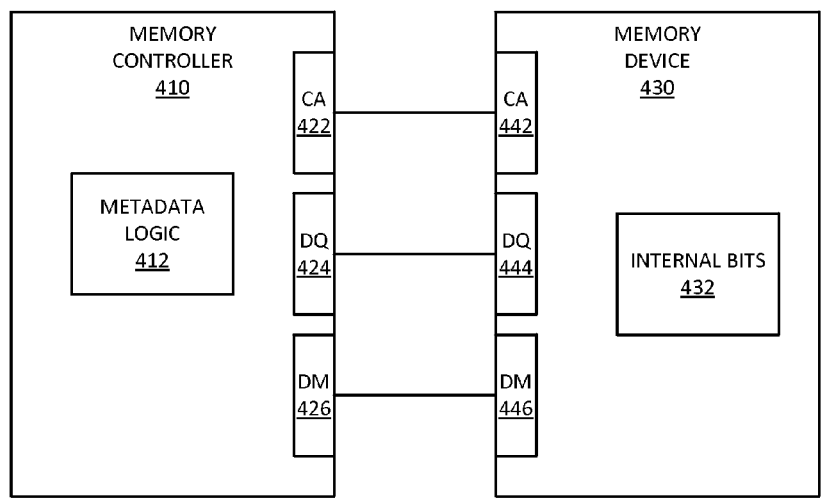
FIG. 4 is a block diagram of an embodiment of a system and a pinout table in which a memory controller interfaces with a memory device for a metadata exchange.

FIG. 4 is a block diagram of an embodiment of a system and a pinout table in which a memory controller interfaces with a memory device for a metadata exchange. System 400 can be one example of a system in accordance with system 100 of FIG. 1, system 200 of FIG. 2, and/or system 300 of FIG. 3. Memory controller 410 is a memory controller in accordance with any embodiment described herein. Memory device 430 is a memory device in accordance with any embodiment described herein.

Memory device 430 includes internal bits 432, which represent storage and/or logic to store and manage the use of internal error correction mechanisms within memory device 430. In one embodiment, memory device 430 exposes internal bits 432 to memory controller 410, to enable the memory controller to use the internal bits as metadata. Memory controller 410 includes metadata logic 412, which represents hardware and/or software to enable memory controller 410 to exchange internal bits 432 with memory device 430.

Memory controller 410 includes one or more hardware I/O interface components, with corresponding I/O interfaces at memory device 430. For example, memory controller includes C/A (labeled as CA) interface 422 with corresponding C/A interface 442 at memory device 430. Interface elements 422 and 442 represent a command/address bus over which memory controller 410 sends commands to memory device 430, including memory access commands.

Memory controller 410 includes DQ interface 424 with corresponding DQ interface 444 at memory device 430. DQ interfaces 424 and 444 represent a data bus over which the memory controller and memory device exchange data. In one embodiment, memory controller 410 includes DM interface 426 with corresponding DM interface 446 at memory device 430. DM interfaces 426 and 446 represent a direct memory interface. Each of the interfaces (422 to 442, 424 to 444, and 426 to 446) can be considered a separate I/O interface, or can be considered part of a single interface between the devices.

In one embodiment, memory controller 410 and memory device 430 transfer data as follows. Memory controller 410 sends a memory access command over CA interfaces 422, 442 to memory device 430. Memory device 430 receives and decodes the command. For a write, memory controller 410 also sends data to be written over DQ interface 424, 444. In one embodiment, memory controller 410 also computes and sends metadata via metadata logic 412 over DM interface 426, 446 with the write data. Memory device 430 receives the write data and the write metadata, and stores both sets of data, the DQ data in the memory array(s), and the write metadata as internal bits 432. In one embodiment, internal bits 432 can be stored as part of the main memory array(s) alongside the DQ data. In one embodiment, internal bits 432 can be implemented as separate bit(s). For a read, memory device 430 receives and decodes the command and address. The memory device prefetches the data from the memory array(s) and sends the data over DQ interface 444, 424. Memory device 430 also accesses internal bits 432 and sends the bits as read metadata over DM interface 446, 426.

It will be understood that other pins can be used to transfer metadata. For example, DQ interface 424, 444 can include one or more additional pins and signal lines for transferring metadata. In another embodiment, there can be one or more other pins in the interface between memory controller 410 and memory device 430 that can be used for memory device 430 to expose internal bits 432 and for memory controller 410 to access internal bits 432. The interface selected to transfer the metadata can be pins or signal lines that are otherwise inactive for read or write operations. The pins or signal lines could alternatively serve a different purpose during read or write and be repurposed.

In one embodiment, memory controller 410 and memory device 430 can additionally or alternatively use a DBI interface (not shown) to exchange metadata. It will be understood that the data exchange occurs over a burst of transfer periods that are all part of a specific read/write transaction or operation. The metadata can likewise be sent in a burst with any of a number of different options. Table 450 illustrates transfer options for different configurations of memory device 430. It will be understood that table 450 is illustrative rather than restrictive. Table 450 specifically illustrates several configurations for transferring 128 bits of data and 8 bits of metadata. For example, a configuration with a x16 interface width with a burst length of BL8, a configuration with a x32 interface width with a burst length of BL4, and a configuration with a x64 interface width with a burst length of BL2.

In one embodiment, for the x16 configuration, system 400 can transfer metadata bits 0 to 7 over a single pin or connector DM[x]. In such a configuration, the other pins DM[y,z,w] are not used. In the x16 configuration, system 400 can also transfer metadata bits over any binary combination of eight total DM pins. For example, system 400 can transfer metadata bits 0 to 3 over DM[x] and metadata bits 4 to 7 over DM[y]. In such an example, it will be understood that the pins would not transfer metadata over the last four bursts, even though the system would be transferring the data over those bursts. As another example, system 400 can transfer metadata bits 0 and 1 over DM[x], 2 and 3 over DM[y], 4 and 5 over DM[z], and 6 and 7 over DM[w]. With eight DM pins, it will be understood that each of the eight pins could be used to send a single bit during a single burst. In such an example, the single burst could be either the first or the last burst.

In the x32 configuration, system 400 can transfer 8 metadata bits in accordance with similar options. In one example, system 400 can transfer metadata bits 0 to 3 over DM[x] and metadata bits 4 to 7 over DM[y]. In such an example, it will be understood that the pins would not transfer metadata over the last two bursts. As another example, system 400 can transfer metadata bits 0 and 1 over DM[x], 2 and 3 over DM[y], 4 and 5 over DM[z], and 6 and 7 over DM[w], with each pin being idle for the last two bursts. In the x32 configuration, system 400 could also transfer all metadata bits in a single burst with 8 transfer signal lines or pins. Similarly, in the x64 configuration, system 400 can transfer metadata bits 0 and 1 over DM[x], 2 and 3 over DM[y], 4 and 5 over DM[z], and 6 and 7 over DM[w]. In the x642 configuration, system 400 could also transfer all metadata bits in a single burst with 8 transfer signal lines or pins.

Figure 5:
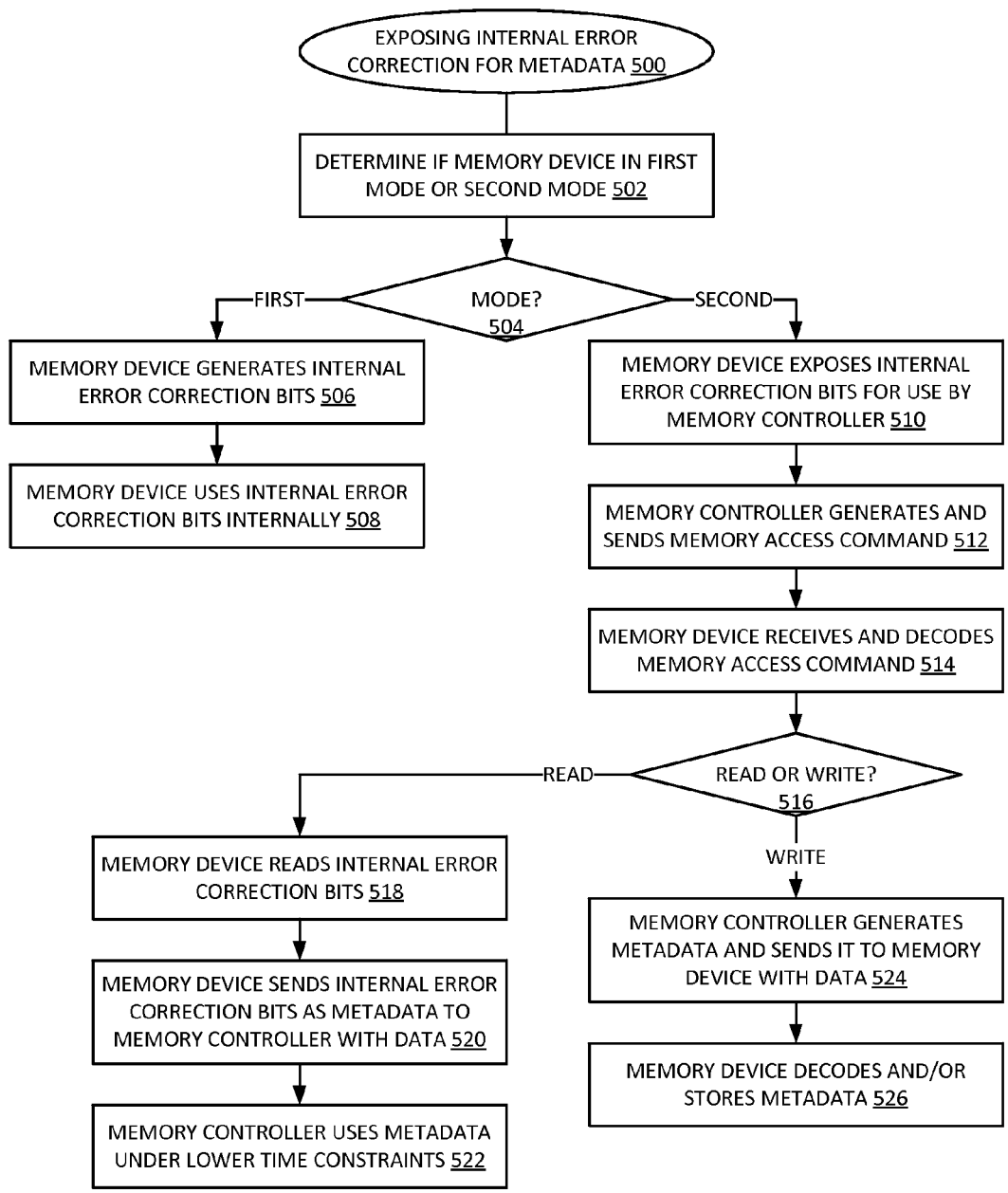
FIG. 5 is a flow diagram of an embodiment of a process for interfacing between a memory controller and a memory device to exchange metadata.

FIG. 5 is a flow diagram of an embodiment of a process for interfacing between a memory controller and a memory device to exchange data for buses of different bandwidths. Process 500 represents operations in a process by which a memory device exposes internal error correction bits to a memory controller, and/or a memory controller accesses the internal error correction bits of a memory device. In one embodiment, the memory device can be bimodal, and the system determines if the memory device is in a first or a second mode, 502. In one embodiment, the memory device is designed or configured to have a single mode that always exposes the internal error correction bits.

If the memory device is in the first mode, 504 FIRST branch, the memory device generates internal error correction bits, 506, and uses the internal error correction bits internally, 508. Thus, the memory device does not expose the internal error correction bits to the external memory controller. If the memory device is in the second mode, 504 SECOND branch, the memory device exposes the internal error correction bits for use by the memory controller, 510.

The memory controller generates and sends a memory access command related to operations by a host, 512. The memory device receives and decodes the memory access command, 514. If the command is a read, 516 READ branch, the memory device reads the internal error correction bits and fetches the data indicated by the command, 518. The memory device sends the internal error correction bits as metadata to the memory controller with the data, 520. As discussed above, there are multiple different ways in which the memory device can transfer the metadata bits to the memory controller. The memory controller uses the metadata under lower time constraints than the memory device would use the bits for internal error correction, 522.

If the command is a write, 516 WRITE branch, the memory controller generates the metadata bits and sends the metadata with the data to the memory device, 524. Again, there are many different ways in which the memory controller can transfer the metadata to the memory device. The memory device writes the data and stores and/or decodes the metadata received from the memory controller, 526. In either the case of read or write, the metadata can be used for purposes of error correction at the memory controller instead of the memory device and/or can be used for non-error correction purposes.

Process 500 is described with reference to a memory controller and a memory device. As discussed above, in one embodiment, the memory device can be one of multiple memory devices coupled to the memory controller. Multiple memory devices can be coupled in parallel to the memory controller, and the memory controller combine the metadata from multiple different device. In a combined scenario, the memory controller can treat metadata from one memory device as a portion of the total bits of metadata computed. For example, the memory controller can generate more than eight bits of metadata as error correction or other metadata, and store and retrieve the metadata from multiple memory devices coupled in parallel (such as in a rank of memory). In such an implementation, the operations by the memory controller in process 500 would include metadata exchanged with more devices. The operations by the memory device in process 500 could be performed by multiple memory devices.

Figure 6:
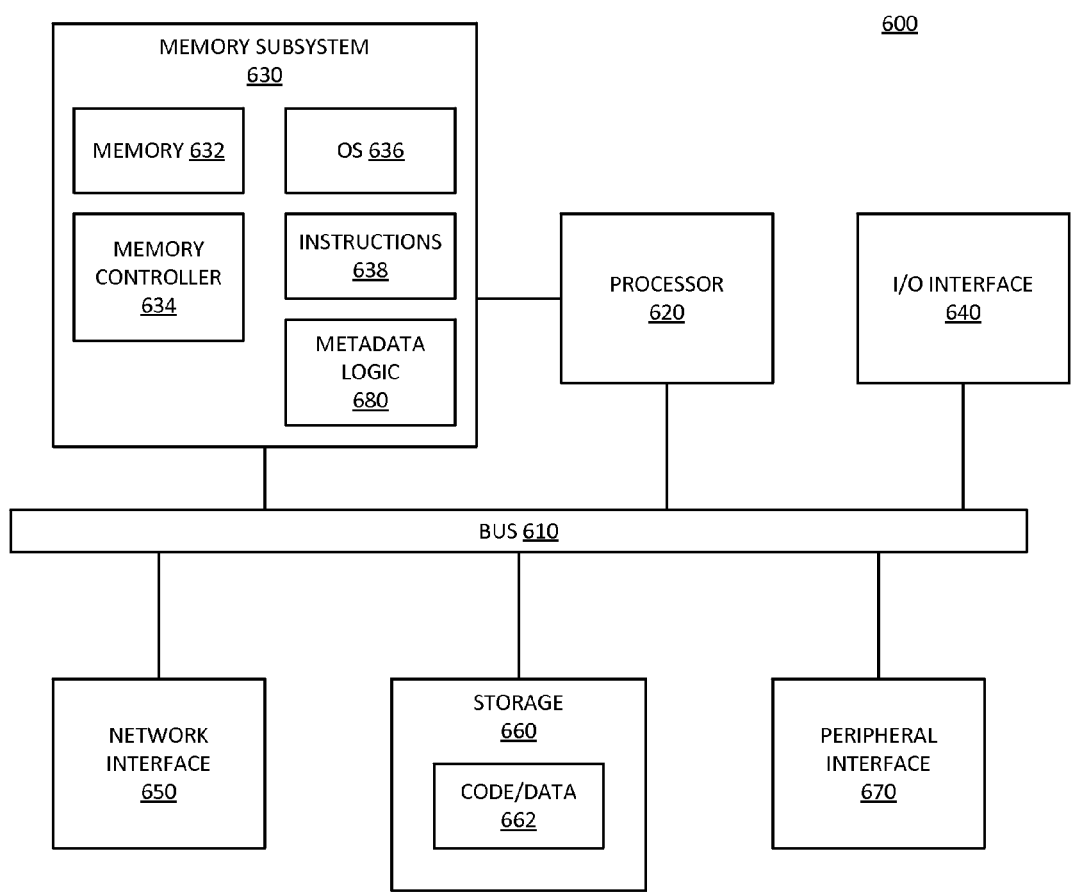
FIG. 6 is a block diagram of an embodiment of a computing system in which internal bits exposed as metadata bits can be implemented.

FIG. 6 is a block diagram of an embodiment of a computing system in which common die interfacing to data buses of different bandwidth can be implemented. System 600 represents a computing device in accordance with any embodiment described herein, and can be a laptop computer, a desktop computer, a server, a gaming or entertainment control system, a scanner, copier, printer, routing or switching device, or other electronic device. System 600 includes processor 620, which provides processing, operation management, and execution of instructions for system 600. Processor 620 can include any type of microprocessor, central processing unit (CPU), processing core, or other processing hardware to provide processing for system 600. Processor 620 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 630 represents the main memory of system 600, and provides temporary storage for code to be executed by processor 620, or data values to be used in executing a routine. Memory subsystem 630 can include one or more memory devices such as read-only memory (ROM), flash memory, one or more varieties of random access memory (RAM), or other memory devices, or a combination of such devices. Memory subsystem 630 stores and hosts, among other things, operating system (OS) 636 to provide a software platform for execution of instructions in system 600. Additionally, other instructions 638 are stored and executed from memory subsystem 630 to provide the logic and the processing of system 600. OS 636 and instructions 638 are executed by processor 620. Memory subsystem 630 includes memory device 632 where it stores data, instructions, programs, or other items. In one embodiment, memory subsystem includes memory controller 634, which is a memory controller to generate and issue commands to memory device 632. It will be understood that memory controller 634 could be a physical part of processor 620.

Processor 620 and memory subsystem 630 are coupled to bus/bus system 610. Bus 610 is an abstraction that represents any one or more separate physical buses, communication lines/interfaces, and/or point-to-point connections, connected by appropriate bridges, adapters, and/or controllers. Therefore, bus 610 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 610 can also correspond to interfaces in network interface 650.

System 600 also includes one or more input/output (I/O) interface(s) 640, network interface 650, one or more internal mass storage device(s) 660, and peripheral interface 670 coupled to bus 610. I/O interface 640 can include one or more interface components through which a user interacts with system 600 (e.g., video, audio, and/or alphanumeric interfacing). In one embodiment, I/O interface 640 can include a high definition (HD) display that provides an output to a user. High definition can refer to a display having a pixel density of approximately 100 PPI (pixels per inch) or greater, and can include formats such as full HD (e.g., 1080 p), retina displays, 4K (ultra high definition or UHD), or others. High definition can also refer to projected displays (e.g., head-mounted displays) that have comparable visual quality to pixel displays. Network interface 650 provides system 600 the ability to communicate with remote devices (e.g., servers, other computing devices) over one or more networks. Network interface 650 can include an Ethernet adapter, wireless interconnection components, USB (universal serial bus), or other wired or wireless standards-based or proprietary interfaces.

Storage 660 can be or include any conventional medium for storing large amounts of data in a nonvolatile manner, such as one or more magnetic, solid state, or optical based disks, or a combination. Storage 660 holds code or instructions and data 662 in a persistent state (i.e., the value is retained despite interruption of power to system 600). Storage 660 can be generically considered to be a "memory," although memory 630 is the executing or operating memory to provide instructions to processor 620. Whereas storage 660 is nonvolatile, memory 630 can include volatile memory (i.e., the value or state of the data is indeterminate if power is interrupted to system 600).

Peripheral interface 670 can include any hardware interface not specifically mentioned above. Peripherals refer generally to devices that connect dependently to system 600. A dependent connection is one where system 600 provides the software and/or hardware platform on which operation executes, and with which a user interacts.

In one embodiment, system 600 includes metadata logic 680, which enables memory device 632 and memory controller 634 to exchange metadata during a read or write transaction. Memory device 632 exposes internal error correction bits to memory controller 634. In one embodiment, memory controller 634 generates and consumes the metadata, which is stored in memory device 632. The internal error correction bits can be used by the memory controller for error correction at the memory controller under reduced timing constraints. The memory controller could also or alternatively use the metadata for something other than error correction. Memory subsystem 630 can include multiple memory devices 632, which can be coupled in parallel to memory controller 634 to allow the memory controller access to more metadata bits.

Figure 7:
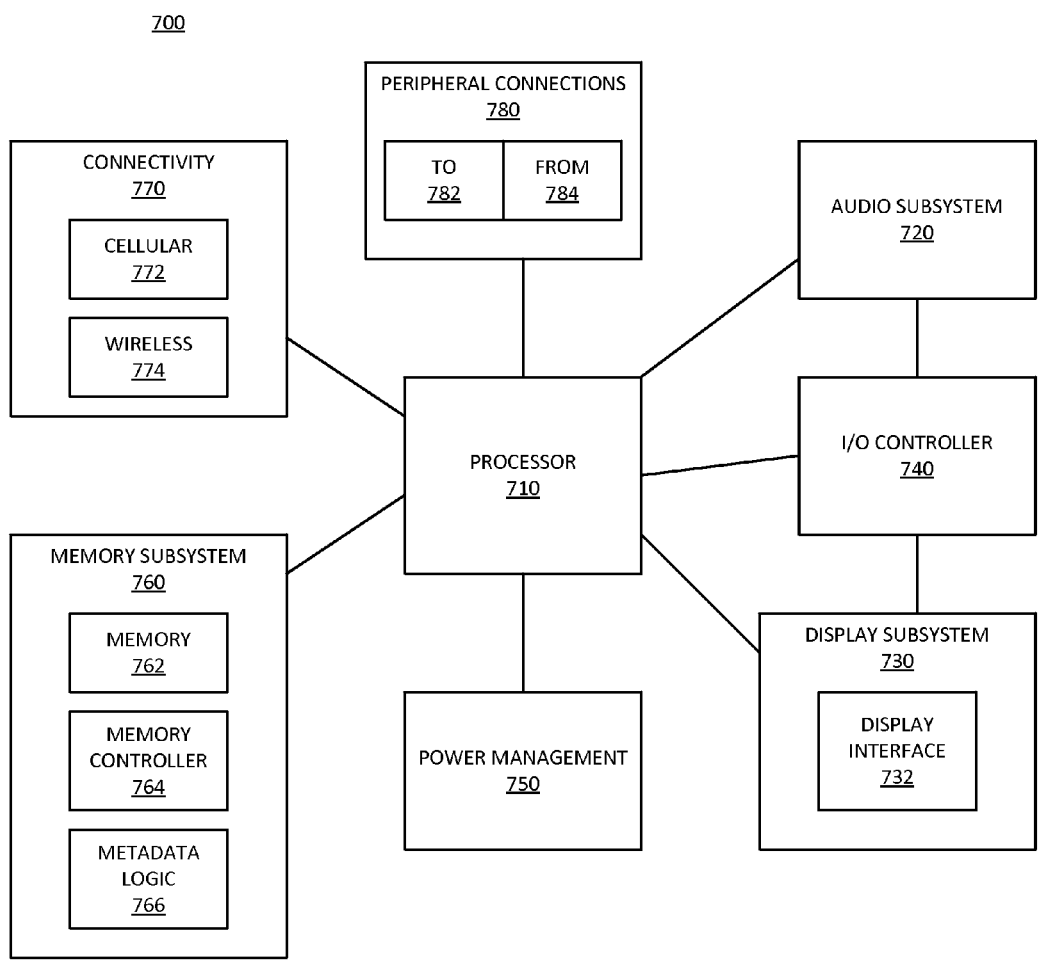
FIG. 7 is a block diagram of an embodiment of a mobile device in which internal bits exposed as metadata bits can be implemented.

FIG. 7 is a block diagram of an embodiment of a mobile device in which common die interfacing to data buses of different bandwidth can be implemented. Device 700 represents a mobile computing device, such as a computing tablet, a mobile phone or smartphone, a wireless-enabled e-reader, wearable computing device, or other mobile device. It will be understood that certain of the components are shown generally, and not all components of such a device are shown in device 700.

Device 700 includes processor 710, which performs the primary processing operations of device 700. Processor 710 can include one or more physical devices, such as microprocessors, application processors, microcontrollers, programmable logic devices, or other processing means. The processing operations performed by processor 710 include the execution of an operating platform or operating system on which applications and/or device functions are executed. The processing operations include operations related to I/O (input/output) with a human user or with other devices, operations related to power management, and/or operations related to connecting device 700 to another device. The processing operations can also include operations related to audio I/O and/or display I/O.

In one embodiment, device 700 includes audio subsystem 720, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 700, or connected to device 700. In one embodiment, a user interacts with device 700 by providing audio commands that are received and processed by processor 710.

Display subsystem 730 represents hardware (e.g., display devices) and software (e.g., drivers) components that provide a visual and/or tactile display for a user to interact with the computing device. Display subsystem 730 includes display interface 732, which includes the particular screen or hardware device used to provide a display to a user. In one embodiment, display interface 732 includes logic separate from processor 710 to perform at least some processing related to the display. In one embodiment, display subsystem 730 includes a touchscreen device that provides both output and input to a user. In one embodiment, display subsystem 730 includes a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others.

I/O controller 740 represents hardware devices and software components related to interaction with a user. I/O controller 740 can operate to manage hardware that is part of audio subsystem 720 and/or display subsystem 730. Additionally, I/O controller 740 illustrates a connection point for additional devices that connect to device 700 through which a user might interact with the system. For example, devices that can be attached to device 700 might include microphone devices, speaker or stereo systems, video systems or other display device, keyboard or keypad devices, or other I/O devices for use with specific applications such as card readers or other devices.

As mentioned above, I/O controller 740 can interact with audio subsystem 720 and/or display subsystem 730. For example, input through a microphone or other audio device can provide input or commands for one or more applications or functions of device 700. Additionally, audio output can be provided instead of or in addition to display output. In another example, if display subsystem includes a touchscreen, the display device also acts as an input device, which can be at least partially managed by I/O controller 740. There can also be additional buttons or switches on device 700 to provide I/O functions managed by I/O controller 740.

In one embodiment, I/O controller 740 manages devices such as accelerometers, cameras, light sensors or other environmental sensors, gyroscopes, global positioning system (GPS), or other hardware that can be included in device 700. The input can be part of direct user interaction, as well as providing environmental input to the system to influence its operations (such as filtering for noise, adjusting displays for brightness detection, applying a flash for a camera, or other features). In one embodiment, device 700 includes power management 750 that manages battery power usage, charging of the battery, and features related to power saving operation.

Memory subsystem 760 includes memory device(s) 762 for storing information in device 700. Memory subsystem 760 can include nonvolatile (state does not change if power to the memory device is interrupted) and/or volatile (state is indeterminate if power to the memory device is interrupted) memory devices. Memory 760 can store application data, user data, music, photos, documents, or other data, as well as system data (whether long-term or temporary) related to the execution of the applications and functions of system 700. In one embodiment, memory subsystem 760 includes memory controller 764 (which could also be considered part of the control of system 700, and could potentially be considered part of processor 710). Memory controller 764 includes a scheduler to generate and issue commands to memory device 762.

Connectivity 770 includes hardware devices (e.g., wireless and/or wired connectors and communication hardware) and software components (e.g., drivers, protocol stacks) to enable device 700 to communicate with external devices. The external device could be separate devices, such as other computing devices, wireless access points or base stations, as well as peripherals such as headsets, printers, or other devices.

Connectivity 770 can include multiple different types of connectivity. To generalize, device 700 is illustrated with cellular connectivity 772 and wireless connectivity 774. Cellular connectivity 772 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 774 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 780 include hardware interfaces and connectors, as well as software components (e.g., drivers, protocol stacks) to make peripheral connections. It will be understood that device 700 could both be a peripheral device ("to" 782) to other computing devices, as well as have peripheral devices ("from" 784) connected to it. Device 700 commonly has a "docking" connector to connect to other computing devices for purposes such as managing (e.g., downloading and/or uploading, changing, synchronizing) content on device 700. Additionally, a docking connector can allow device 700 to connect to certain peripherals that allow device 700 to control content output, for example, to audiovisual or other systems.

In addition to a proprietary docking connector or other proprietary connection hardware, device 700 can make peripheral connections 780 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, system 700 includes metadata logic 766, which enables memory device 762 and memory controller 764 to exchange metadata during a read or write transaction. Memory device 762 exposes internal error correction bits to memory controller 764. In one embodiment, memory controller 764 generates and consumes the metadata, which is stored in memory device 762. The internal error correction bits can be used by the memory controller for error correction at the memory controller under reduced timing constraints. The memory controller could also or alternatively use the metadata for something other than error correction. Memory subsystem 760 can include multiple memory devices 762, which can be coupled in parallel to memory controller 764 to allow the memory controller access to more metadata bits.

In one aspect, a method for interfacing a memory device and a memory controller includes: determining if a memory device is in a first mode or a second mode; and in the first mode, applying internal error correction bits only internally at the memory device; and in the second mode, exposing the internal error correction bits to an external memory controller as metadata bits for use by the external memory controller.

In one embodiment, exposing the internal error correction bits to the external memory controller as metadata bits comprises exposing the internal error correction bits for the memory controller to exchange non-error-correction information with the memory device. In one embodiment, exposing the internal error correction bits to the external memory controller as metadata bits comprises exposing the internal error correction bits for the memory controller to correct errors instead of the memory device correcting errors internally. In one embodiment, exposing the internal error correction bits for the memory controller to correct errors further comprises, in the second mode: generating internal error correction bits internally at the memory device in response to a read request; and sending the internal error correction bits to the memory controller for the memory controller to apply error correction to data bits based on the internal error correction bits. In one embodiment, exposing the internal error correction bits for the memory controller to correct errors further comprises, in the second mode: receiving error correction bits computed by the memory controller in conjunction with a write request; and storing the error correction bits internally at the memory device. In one embodiment, exposing the internal error correction bits for the memory controller comprises exchanging the internal error correction bits with the memory controller on signal lines that are otherwise inactive for read and write. In one embodiment, exposing the internal error correction bits for the memory controller further comprises: exposing internal error correction bits as one of multiple different memory devices to the memory controller to increase a number of metadata bits available to the memory controller.

In one aspect, a memory device to interface with a memory controller in a memory subsystem, comprising: multiple memory cells to store data; internal error correction hardware including storage separate from the memory cells to store internal error correction bits; and logic to determine if the memory device is in a first mode or a second mode, wherein in the first mode the logic is to apply the error correction bits only internally with the internal error correction hardware, and wherein in the second mode the logic is to expose the internal error correction bits to the memory controller over the as metadata bits for use by the memory controller.

In one embodiment, the logic is to expose the internal error correction bits to the memory controller as metadata bits for the memory controller to exchange non-error-correction information with the memory device. In one embodiment, the logic is to expose the internal error correction bits to the external memory controller as metadata bits for the memory controller to correct errors instead of the memory device correcting errors internally. In one embodiment, the logic is to expose the internal error correction bits for the memory controller to correct errors including the error correction logic to generate the internal error correction bits in response to a read request and the logic send the internal error correction bits to cause the memory controller to apply error correction to data bits based on the internal error correction bits. In one embodiment, the logic is to expose the internal error correction bits for the memory controller to correct errors including the logic to receive error correction bits computed by the memory controller in conjunction with a write request and store the error correction bits internally in the storage separate from the memory cells. In one embodiment, the logic is to exchange the internal error correction bits with the memory controller on signal lines that are otherwise inactive for read and write.

In one aspect, an electronic device with a memory subsystem, comprising: a memory controller; a memory device to interface with the memory controller, the memory device including multiple memory cells to store data; internal error correction hardware including storage separate from the memory cells to store internal error correction bits; and logic to determine if the memory device is in a first mode or a second mode, wherein in the first mode the logic is to apply the error correction bits only internally with the internal error correction hardware, and wherein in the second mode the logic is to expose the internal error correction bits to the memory controller over the as metadata bits for use by the memory controller; and a touchscreen display coupled to generate a display based on data accessed from the memory devices.

In one embodiment, the logic is to expose the internal error correction bits to the memory controller as metadata bits for the memory controller to exchange non-error-correction information with the memory device. In one embodiment, the logic is to expose the internal error correction bits to the external memory controller as metadata bits for the memory controller to correct errors instead of the memory device correcting errors internally. In one embodiment, the logic is to expose the internal error correction bits for the memory controller to correct errors including the error correction logic to generate the internal error correction bits in response to a read request and the logic send the internal error correction bits to cause the memory controller to apply error correction to data bits based on the internal error correction bits. In one embodiment, the logic is to expose the internal error correction bits for the memory controller to correct errors including the logic to receive error correction bits computed by the memory controller in conjunction with a write request and store the error correction bits internally in the storage separate from the memory cells. In one embodiment, the logic is to exchange the internal error correction bits with the memory controller on signal lines that are otherwise inactive for read and write. In one embodiment, the memory device is one of multiple memory devices to interface with the memory controller, and further comprising the memory controller to include logic to exchange internal error correction bits from multiple different memory devices to increase a number of metadata bits available to the memory controller.

In one aspect, an article of manufacture comprising a computer readable storage medium having content stored thereon, which when executed performs operations for interfacing in a memory subsystem, including: determining if a memory device is in a first mode or a second mode; and in the first mode, applying internal error correction bits only internally at the memory device; and in the second mode, exposing the internal error correction bits to an external memory controller as metadata bits for use by the external memory controller.

In one embodiment, the content for exposing the internal error correction bits to the external memory controller as metadata bits comprises content for exposing the internal error correction bits for the memory controller to exchange non-error-correction information with the memory device. In one embodiment, the content for exposing the internal error correction bits to the external memory controller as metadata bits comprises content for exposing the internal error correction bits for the memory controller to correct errors instead of the memory device correcting errors internally. In one embodiment, the content for exposing the internal error correction bits for the memory controller to correct errors further comprises, in the second mode, content for generating internal error correction bits internally at the memory device in response to a read request; and sending the internal error correction bits to the memory controller for the memory controller to apply error correction to data bits based on the internal error correction bits. In one embodiment, the content for exposing the internal error correction bits for the memory controller to correct errors further comprises, in the second mode, content for receiving error correction bits computed by the memory controller in conjunction with a write request; and storing the error correction bits internally at the memory device. In one embodiment, the content for exposing the internal error correction bits for the memory controller comprises content for exchanging the internal error correction bits with the memory controller on signal lines that are otherwise inactive for read and write. In one embodiment, the content for exposing the internal error correction bits for the memory controller further comprises content for exposing internal error correction bits as one of multiple different memory devices to the memory controller to increase a number of metadata bits available to the memory controller.

In one aspect, an apparatus to interface with a memory controller in a memory subsystem, comprising: means for determining if a memory device is in a first mode or a second mode; and means for, in the first mode, applying internal error correction bits only internally at the memory device; and means for, in the second mode, exposing the internal error correction bits to an external memory controller as metadata bits for use by the external memory controller.

In one embodiment, the means for exposing the internal error correction bits to the external memory controller as metadata bits comprises means for exposing the internal error correction bits for the memory controller to exchange non-error-correction information with the memory device. In one embodiment, the means for exposing the internal error correction bits to the external memory controller as metadata bits comprises means for exposing the internal error correction bits for the memory controller to correct errors instead of the memory device correcting errors internally. In one embodiment, the means for exposing the internal error correction bits for the memory controller to correct errors further comprises, in the second mode, means for generating internal error correction bits internally at the memory device in response to a read request; and sending the internal error correction bits to the memory controller for the memory controller to apply error correction to data bits based on the internal error correction bits. In one embodiment, the means for exposing the internal error correction bits for the memory controller to correct errors further comprises, in the second mode, means for receiving error correction bits computed by the memory controller in conjunction with a write request; and storing the error correction bits internally at the memory device. In one embodiment, the means for exposing the internal error correction bits for the memory controller comprises means for exchanging the internal error correction bits with the memory controller on signal lines that are otherwise inactive for read and write. In one embodiment, the means for exposing the internal error correction bits for the memory controller further comprises means for exposing internal error correction bits as one of multiple different memory devices to the memory controller to increase a number of metadata bits available to the memory controller.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for interfacing a memory device and a memory controller, comprising:
   determining if a memory device is in a first mode or a second mode; and
   in the first mode, applying internal error correction bits only internally at the memory device to perform error correction prior to sending read data to the memory controller, where the error correction bits and error correction are transparent to the memory controller; and
   in the second mode, providing access to the internal error correction bits by the memory controller as metadata bits for use by the memory controller to perform error correction external to the memory device.

2. The method of claim 1, wherein providing access to the internal error correction bits comprises providing access to the internal error correction bits by the memory controller to enable the memory controller to improve error correction for data exchanged with the memory device.

3. The method of claim 1, wherein providing access to the internal error correction bits comprises providing access to the internal error correction bits by the memory controller to enable the memory controller to correct errors instead of the memory device correcting errors internally.

4. The method of claim 3, wherein providing access to the internal error correction bits by the memory controller to enable the memory controller to correct errors further comprises, in the second mode:
   generating internal error correction bits internally at the memory device in response to a read request; and
   sending the internal error correction bits to the memory controller for the memory controller to apply error correction to data bits based on the internal error correction bits.

5. The method of claim 3, wherein providing access to the internal error correction bits by the memory controller to enable the memory controller to correct errors further comprises, in the second mode:
   receiving error correction bits computed by the memory controller in conjunction with a write request; and
   storing the error correction bits internally at the memory device.

6. The method of claim 1, wherein providing access to the internal error correction bits by the memory controller comprises the memory device transferring the internal error correction bits to the memory controller on signal lines that are otherwise inactive for read and write.

7. The method of claim 1, wherein providing access to the internal error correction bits by the memory controller further comprises:

the memory device providing access to the internal error correction bits as one of multiple different memory devices that provide access to internal error correction bits to the memory controller to increase a number of metadata bits available to the memory controller.

8. A memory device to interface with a memory controller in a memory subsystem, comprising:

multiple memory cells to store data;

internal error correction hardware including storage separate from the memory cells to store internal error correction bits; and logic to determine if the memory device is in a first mode or a second mode, wherein in the first mode the logic is to apply the internal error correction bits only internally with the internal error correction hardware to perform error correction prior to transmission of read data to the memory controller, and wherein in the second mode the logic is to provide access to the internal error correction bits by the memory controller as metadata bits for use by the memory controller to perform error correction external to the memory device.

9. The memory device of claim 8, wherein the logic is to provide access to the internal error correction bits by the memory controller as metadata bits to enable the memory controller to improve error correction for data exchanged with the memory device.

10. The memory device of claim 8, wherein the logic is to provide access to the internal error correction bits by the memory controller to enable the memory controller to correct errors instead of the memory device correcting errors internally.

11. The memory device of claim 10, wherein the logic is to provide access to the internal error correction bits by the memory controller to enable the memory controller to correct errors including the error correction logic to generate the internal error correction bits in response to a read request and the logic send the internal error correction bits to cause the memory controller to apply error correction to data bits based on the internal error correction bits.

12. The memory device of claim 10, wherein the logic is to provide access to the internal error correction bits by the memory controller to correct errors including the logic to receive error correction bits computed by the memory controller in conjunction with a write request and store the error correction bits internally in the storage separate from the memory cells.

13. The memory device of claim 8, wherein the logic is to exchange the internal error correction bits with the memory controller on signal lines that are otherwise inactive for read and write.

14. An electronic device with a memory subsystem, comprising:

a memory controller;

a memory device to interface with the memory controller, the memory device including multiple memory cells to store data;

internal error correction hardware including storage separate from the memory cells to store internal error correction bits; and logic to determine if the memory device is in a first mode or a second mode, wherein in the first mode the logic is to apply the error correction bits only internally with the internal error correction hardware to perform error correction prior to transmission of read data to the memory controller, and wherein in the second mode the logic is to provide access to the internal error correction bits by the memory controller as metadata bits for use by the memory controller to perform error correction external to the memory device; and a touchscreen display coupled to the memory device to generate a display based on data accessed from the memory devices.

15. The electronic device of claim 14, wherein the logic is to provide access to the internal error correction bits by the memory controller as metadata bits to enable the memory controller to improve error correction for data exchanged with the memory device.

16. The electronic device of claim 14, wherein the logic is to provide access to the internal error correction bits by the memory controller to enable the memory controller to correct errors instead of the memory device correcting errors internally.

17. The electronic device of claim 16, wherein the logic is to provide access to the internal error correction bits by the memory controller to enable the memory controller to correct errors including the error correction logic to generate the internal error correction bits in response to a read request and the logic send the internal error correction bits to cause the memory controller to apply error correction to data bits based on the internal error correction bits.

18. The electronic device of claim 16, wherein the logic is to provide access to the internal error correction bits by the memory controller to correct errors including the logic to receive error correction bits computed by the memory controller in conjunction with a write request and store the error correction bits internally in the storage separate from the memory cells.

19. The electronic device of claim 14, wherein the logic is to exchange the internal error correction bits with the memory controller on signal lines that are otherwise inactive for read and write.

20. The electronic device of claim 14, wherein the memory device is one of multiple memory devices to interface with the memory controller, and further comprising the memory controller to include logic to exchange the internal error correction bits with the memory device and to exchange internal error correction bits with multiple different memory devices to increase a number of metadata bits available to the memory controller.

* * * * *